United States Patent
Tajima et al.

(10) Patent No.: US 6,737,475 B1
(45) Date of Patent: May 18, 2004

(54) BRANCHED POLYACETAL RESIN COMPOSITION

(75) Inventors: Yoshihisa Tajima, Fuji (JP); Hidetoshi Okawa, Fuji (JP); Kuniaki Kawaguchi, Fuji (JP)

(73) Assignee: Polyplastics Co., Ltd., Osaka (JP)

( * ) Notice: Subject to any disclaimer, the term of this patent is extended or adjusted under 35 U.S.C. 154(b) by 0 days.

(21) Appl. No.: 09/869,806

(22) PCT Filed: Dec. 1, 2000

(86) PCT No.: PCT/JP00/08543

§ 371 (c)(1),
(2), (4) Date: Jul. 5, 2001

(87) PCT Pub. No.: WO01/42357

PCT Pub. Date: Jun. 14, 2001

(30) Foreign Application Priority Data

Dec. 6, 1999 (JP) ............................................ 11-346044

(51) Int. Cl.[7] ............................................... C08L 59/00
(52) U.S. Cl. .............................. 525/63; 525/64; 525/68; 525/69; 525/71; 525/88; 525/92 K
(58) Field of Search ............................... 525/63, 64, 68, 525/69, 71, 88, 92 K

(56) References Cited

U.S. PATENT DOCUMENTS

| | | |
|---|---|---|
| 2,768,994 A | 10/1956 | MacDonald |
| 3,027,352 A | 3/1962 | Walling et al. |
| 5,679,743 A | 10/1997 | Hirai et al. .................... 525/88 |

FOREIGN PATENT DOCUMENTS

| | | |
|---|---|---|
| EP | 0 412 783 A2 | 2/1991 |
| EP | 04039319 | 10/1992 |
| EP | 07316366 | 5/1995 |
| EP | 0 823 456 A1 | 2/1998 |
| JP | 8-12734 | 1/1996 |
| WO | WO97/40099 | 10/1997 |

*Primary Examiner*—Jeffrey Mullis
(74) *Attorney, Agent, or Firm*—Nixon & Vanderhye PC

(57) ABSTRACT

To provide a polyacetal resin material in which an excellent sliding property is given and the appearance, dimensional precision, mechanical properties, etc. of the molded article thereof are improved as well. That is, a branched polyacetal resin composition, comprising 100 parts by weight of a branched polyacetal copolymer (A) having an oxymethylene group as the main repeating unit and having a specific branching unit, and 0.5 to 40 parts by weight of at least one polymer (B) selected from the group consisting of the following polymer (B-1) and (B-2), i.e.

polymer (B-1): a graft or block copolymer prepared from an olefin polymer (b-1) and at least one vinyl polymer (b-2); and polymer (B-2): a modified olefin polymer in which an olefin polymer (b-3) is modified with at least one compound selected from the group consisting of an unsaturated carboxylic acid, an unsaturated carboxylic acid anhydride and derivatives thereof and/or 0.1 to 5 parts by weight of a lubricant (C).

6 Claims, No Drawings

BRANCHED POLYACETAL RESIN COMPOSITION

TECHNICAL FIELD OF THE INVENTION

The present invention relates to a branched polyacetal resin composition having an excellent sliding property and also excellent in moldability, surface property, mechanical property, etc.

PRIOR ART

A polyacetal resin has excellent properties in mechanical property, thermal property, electric property, slidability, moldability, etc. and has been widely used mostly as structural materials, functional parts, etc. in electric instruments, car parts, precision machine parts, etc. However, as the field where a polyacetal resin is utilized is expanded, there is a tendency that the properties requested are becoming more and more high, complex and special. For example, there is a demand for a material having a further improved sliding property while maintaining excellent moldability, appearance, etc., which are inherent to the polyacetal resin.

For the purpose of improving the sliding property of the polyacetal resin, incorporation of fluorine resin, silicone, polyolefins and/or lubricants has been conducted. However, in the method of merely incorporating a lubricating component into common polyacetal resins, though sliding properties such as abrasion resistance and slidability can be improved in some degrees, there are various problems such as insufficient molding, poor appearance, etc. caused by the sliding improver incorporated. In particular, a significant deterioration of the appearance, dimensional accuracy, etc. of a molded article occurs, due to the dispersibility and bleeding in case of the polyacetal resin where a liquid lubricant is incorporated, or due to the dispersibility, cohesiveness, phase separation etc. in case of the polyacetal resin where a solid lubricantaing component is incorporated. Such behaviors may often cause a hindrance to mold maintenance, so improvements have been desired. Furthermore, since the incorporation of the above lubricating components generally has a tendency to deteriorate mechanical properties of the polyacetal resins such as rigidity and strength, improvements thereof have been often desired, too.

DISCLOSURE OF THE INVENTION

An object of the present invention is to solve the above-mentioned problems and to provide a polyacetal resin material in which an excellent sliding property is given and the appearance, dimensional accuracy, mechanical property, etc. of the molded article thereof are improved as well.

For achieving the above object, the present inventors have carried out a detail investigation going deeply into the molecular skeleton and physical properties of the polyacetal resin. As a result, they have found a combination of modification of the polymer skeleton, which is effective for achieving the object, and the components effectively incorporated to the polymer, whereupon the present invention has been achieved.

That is, the present invention relates to a branched polyacetal resin composition, in which 100 parts by weight of a branched polyacetal copolymer (A) having an oxymethylene group as the main repeating unit and having a branching unit represented by the following formula (I) are compounded with 0.5 to 40 parts by weight of at least one polymer (B) selected from the group consisting of the following polymers (B-1) and (B-2), i.e., polymer (B-1): a graft or block copolymer prepared from an olefin polymer (b-1) and at least one vinyl polymer (b-2); and polymer (B-2): a modified olefin polymer in which an olefin polymer (b-3) is modified with at least one compound selected from the group consisting of an unsaturated carboxylic acid, an unsaturated carboxylic acid anhydride and derivatives thereof, and/or 0.1 to 5 parts by weight of a lubricant (C).

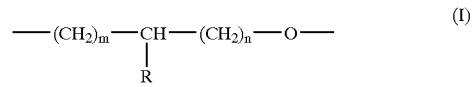

wherein m and n each is an integer of 0 to 5; the sum of m+n is 1 to 5; and R is a monovalent organic group having a molecular weight of 40 to 1000.

The composition comprises (A) and at least one of (B) and (C), (B) being at least one selected from (B-1) and (B-2).

It is quite unexpected and surprising that a branched polyacetal copolymer, which is thus modified with a specific branching unit and compounded with a lubricating component, can give an excellent sliding property and improve the appearance, dimensional accuracy, etc. of a molded article thereof as well.

DETAILED DESCRIPTION OF THE INVENTION

The present invention will be explained in detail. First, the branched polyacetal copolymer (A) used as the base resin in the present invention has an oxymethylene group (—$CH_2$—O—) as the main repeating unit and has a branching unit represented by the following formula (I). The presence of the branching unit is one of the important elements for achieving the object of the present invention. The object of the present invention cannot be achieved by a common polyacetal resin not having the branching unit, even if the specific polymer (B) or lubricant (C) described below is compounded as the lubricating component.

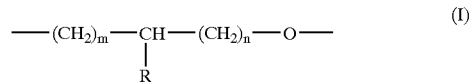

wherein m and n each is an integer of 0 to 5; the sum of m+n is 1 to 5; and R is a monovalent organic group having a molecular weight of 40 to 1000.

In the branching unit represented by the formula (I), the branching group R is a monovalent organic group having a molecular weight of 40 to 1000. If the molecular weight of R is less than 40, improvements in appearance, dimensional accuracy, rigidity, etc. cannot be expected, while if the molecular weight is more than 1000, there is the problem of a reduction in the degree of crystallization. Preferably, the molecular weight of R is 50 to 500. From the viewpoint of the improvements in appearance, dimensional accuracy, rigidity, etc. and the maintenance of other physical properties, the ratio of the branching unit represented by the formula (I) is preferably 0.001 to 10 parts by weight, more preferably 0.01 to 3 parts by weight, to 100 parts by weight of the oxymethylene unit (—$CH_2$—O—).

Although there is no particular limitation for the process for producing the branched polyacetal copolymer (A) of the present invention, the copolymer (A) is preferably prepared by a copolymerization of 100 parts by weight of trioxane (a-1), 0.001 to 10 parts by weight of a monofunctional glycidyl compound (a-2), and 0 to 20 parts by weight of a cyclic ether compound (a-3) copolymerizable with trioxane. The branched polyacetal copolymer (A) comprising such monomers can be produced easily and the resulting copolymers have excellent properties. The trioxane (a-1) used herein is a cyclic trimer of formaldehyde, which is generally obtained by a reaction of an aqueous solution of formaldehyde in the presence of an acid catalyst, and is used after purifying by distillation, etc. It is preferred that the trioxane (a-1) used for the polymerization contains as little as possible of impurities such as water, methanol and formic acid.

The branched polyacetal copolymer (A), composed of oxymethylene units and units (I), may be produced by copolymerizing (a-1) trioxane, (a-2) the monofunctional glycidyl compound and (a-3) the optional cyclic ether compound. Any glycidyl compound may be used to meet the definition of "R" of the formula (I).

The monofunctional glycidyl compound (a-2) refers to organic compounds having one glycidyl group in the molecule. Typical examples thereof include glycidols, glycidyl ethers composed of aliphatic or aromatic alcohols or (poly) alkylene glycol adducts thereof and glycidols, and glycidyl esters composed of fatty or aromatic carboxylic acids or (poly)alkylene glycol adducts thereof and glycidols. The monofunctional glycidyl compound (a-2) is used as a branched structure component of the branched polyacetal copolymer (A) used in the present invention.

As the monofunctional glycidyl compound (a-2), a glycidyl ether compounds represented by the following formulae (II), (III) and (IV) are preferred:

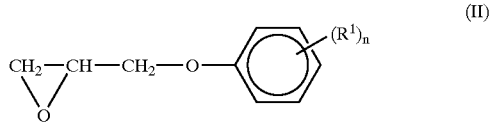

(II)

wherein $R^1$ is a $C_{1-12}$ alkyl group, a substituted alkyl group, an alkoxy group, an aryl group, a substituted aryl group or halogen; and n is an integer of 0 to 5 and, when n is 2 or more, the $R^1$s may be the same or different:

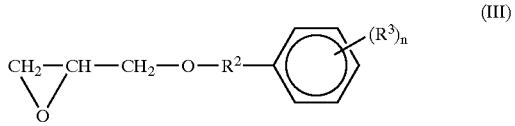

(III)

wherein $R^2$ is a $C_{1-30}$ alkylene group, a substituted alkylene group or a polyalkylene oxide glycol residue; $R^3$ is a $C_{1-12}$ alkyl group, a substituted alkyl group, an alkoxy group, an aryl group, a substituted aryl group or halogen; and n is an integer of 0 to 5 and, when n is 2 or more, the $R^3$s may be the same or different:

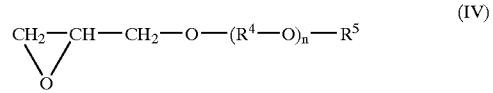

(IV)

wherein $R^4$ is a $C_{1-30}$ alkylene group; n is an integer of 0 to 20; and $R^5$ is a $C_{1-30}$ alkyl group, a $C_{2-20}$ alkenyl group or an alkynyl group.

Specific examples thereof include methyl glycidyl ether, ethyl glycidyl ether, butyl glycidyl ether, 2-ethyl hexyl glycidyl ether, 2-methyl octyl glycidyl ether, phenyl glycidyl ether, p-tert-butyl phenyl glycidyl ether, sec-butyl phenyl glycidyl ether, n-butyl phenyl glycidyl ether, phenyl phenol glycidyl ether, cresyl glycidyl ether, dibromocresyl glycidyl ether, and glycidyl ethers consisting of (poly) ethylene glycol adducts of aliphatic or aromatic alcohols and glycidols. Examples of the glycidyl ester compounds include glycidyl acetate and glycidyl stearate. Among them, those having aromatic rings are preferable. Particularly preferred are the compounds represented by the formulae (II) and (III) and having the substituent $R^1$ or $R^3$ at the ortho-position. As the substituent, preferred is one containing at least 4 carbon atoms, and particularly one having an aromatic ring. For example, o-phenyl phenol glycidyl ether.

In the production of the branched polyacetal copolymer (A) of the present invention, the amount of the monofunctional glycidyl compound (a-2) to be copolymerized is 0.001 to 10 parts by weight, preferably 0.01 to 10 parts by weight, more preferably 0.1 to 5 parts by weight, to 100 parts by weight of trioxane as the component (a-1). If the amount of the component (a-2) in the copolymer is too small, the effect of improving physical properties such as strength and rigidity, as an object of the present invention, cannot be achieved, while if the amount is excessive, there is a fear that problems arise in the strength, rigidity etc. due to a lowering of crystallinity and in the moldability due to a lowering of fluidity.

As the monofunctional glycidyl compound (a-2), preferably used is one having a molecular weight of 100 to 1000. If the molecular weight of the monofunctional glycidyl compound (a-2) is too high, the branched chains of the resulting branched polyacetal copolymer (A) become longer, which may disturb the crystallinity of the resin, etc. to exert an undesired influence on the slidability as a basic property. On the other hand, if the molecular weight of the component (a-2) is too low, the effect of improving and maintaining the appearance, dimension accuracy, rigidity, etc. as the object of the present invention is minimized.

The branched polyacetal copolymer (A) of the present invention is preferably copolymerized further with the cyclic ether compound (a-3) copolymerizable with trioxane as the copolymerizing component other than the components described above. The cyclic ether compound (a-3) is not particularly essential for improving the sliding property while maintaining and improving the appearance, dimensional accuracy, rigidity etc. as desired in the present invention, but this cyclic ether compound is used preferably as a copolymerizable monomer in order to stabilize the polymerization reaction for producing the branched polyacetal copolymer (A) and to improve the thermostability of the resulting branched polyacetal copolymer (A). Examples of the cyclic ether compound (a-3) copolymerizable with trioxane include ethylene oxide, propylene oxide, butylene oxide, epichlorohydrin, epibromohydrin, styrene oxide, oxetane, 3,3-bis(chloromethyl) oxetane, tetrahydrofuran, trioxepane, 1,3-dioxolane, ethylene glycol formal, propylene glycol formal, diethylene glycol formal, triethylene glycol formal, 1,4-butane diol formal, 1,5-pentane diol formal and 1,6-hexane diol formal. Among them, ethylene oxide, 1,3-dioxolane, diethylene glycol formal and 1,4-butane diol formal are preferable. In the branched polyacetal copolymer (A) used in the present invention, the amount of the cyclic ether compound (a-3) to be copolymerized is 0 to 20 parts by weight, preferably 0.05 to 15 parts by weight, more preferably 0.1 to 10 parts by weight, to 100 parts by weight of trioxane as component (a-1). If the amount of the cyclic ether compound (a-3) in the copolymer is too small, a copolymerization reaction becomes unstable and the resulting branched polyacetal copolymer is inferior in thermostability, while if the amount of the cyclic ether compound (a-3) in the copolymer is excessive, the resulting copolymer is poor in mechanical physical properties such as rigidity and strength.

Basically, the branched polyacetal copolymer (A) of the present invention is obtained, for example, by a method of bulk polymerization of the trioxane (a-1), the monofunctional glycidyl compound (a-2) and the cyclic ether compound (a-3) using a cationic polymerization catalyst, where if necessary, an appropriate amount of a molecular-weight regulator is added thereto.

Examples of the molecular-weight regulator include low-molecular acetal compounds having alkoxy groups such as methylal, methoxy methylal, dimethoxy methylal, trimethoxy methylal and oxymethylene di-n-butyl ether, alcohols such as methanol, ethanol and butanol, and ester compounds. Among these compounds, the low-molecular acetal compounds having alkoxy groups are particularly preferable. There is no limitation at all for the amount of such a molecular-weight regulator to be added so far as the effect of the present invention is not deteriorated.

Examples of the cationic polymerization catalyst include lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride, boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine, inorganic and organic acids such as perchloric acid, acetyl perchlorate, t-butyl perchlorate, hydroxyacetic acid, trichloroacetic acid, trifluoroacetic acid and p-toluene sulfonic acid, complex salt compounds such as triethyl oxonium tetrafluoroborate, triphenyl methyl hexafluoroantimonate, allyl diazonium hexafluorophosphate and allyl diazonium tetrafluoroborate, alkyl metal salts such as diethyl zinc, triethyl aluminum and diethyl aluminum chloride, heteropoly acid and isopoly acid. Among these compounds, boron trifluoride and boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine complex are preferable. Such a catalyst may be diluted with an organic solvent or the like and then used.

In the branched polyacetal copolymer (A) used in the present invention, it is desirable that the constituent units derived from the monofunctional glycidyl compound (a-2) and the cyclic ether compound (a-3) are uniformly dispersed in a molecular chain of the polyacetal copolymer. For such a condition, the following process in the production of the polyacetal copolymer (A) is effective; a method in which the glycidyl compound (a-2), the cyclic ether compound (a-3) and the catalyst are uniformly mixed in advance and the mixture is added to the molten trioxane (a-1) separately fed to a polymerizer, or a method in which the above uniform mixture is further mixed with the trioxane (a-1) and then they are polymerized in a polymerizer. Particularly, since the reaction rate of the glycidyl compound (a-2) is often slower than those of the other components (a-1) and (a-3), it is very effective to previously mix the component (a-2) with the catalyst. Thus, by mixing the components previously in the form of a uniform solution, the dispersion of a branched structure derived from the glycidyl compound is well so that the effect of improving a sliding property, which is attained by the incorporation of the lubricating component described below, becomes still more excellent while the appearance, dimensional accuracy, rigidity, etc. are also satisfactory.

There is no particular limitation for the polymerizer in the production of the polyacetal copolymer (A) used in the present invention but known apparatuses may be used and any of a batch system, a continuous method, etc. may be applicable. It is preferred to keep the polymerization temperature at 65 to 135° C. Deactiviation after the polymerization is carried out by adding a basic compound or an aqueous solution thereof to a reaction product discharged from the polymerizer after the polymerization reaction or to a reaction product in the polymerizer.

Examples of the basic compound for neutralizing and deactivating the polymerization catalyst include ammonia, amines such as triethyl amine, tributyl amine, triethanol amine and tributanol amine, hydroxide salts of alkali metal or alkaline earth metal, and other known deactivators of the catalyst. It is preferred that, after the polymerization, an aqueous solution thereof is added to the product without delay to conduct deactiviation. After such a polymerization and a deactivation, washing, separation/recovery of unreacted monomers, drying, etc. may be carried out by conventional methods, if necessary.

The polymerization degree and the like of the polyacetal copolymer (A) thus obtained and used in the present invention are not particularly limited. The polymerization degree and the like can be controlled in accordance with the purpose of the product and molding means. When the polymer is to be molded, the melt index (MI) thereof, as determined at a temperature of 190° C. under a loading of 2.06 kg, is preferably from 1 to 100 g/10 min., more preferably from 2 to 90 g/10 min. Further, a small amount of a cross-linking agent such as a diglycidyl compound can be copolymerized in order to control the viscosity.

In the process for producing the polyacetal copolymer (A) and the composition of monomers described above, it is possible to use a cyclic formal compound capable of forming branched chains in place of the monofunctional glycidyl compound (a-2), and the obtained polyacetal copolymer (A) is as preferable as the above-described one. Examples of the cyclic formal compound capable of forming branched chains include 4-methyl-1,3-dioxolane, 4-ethyl-1,3-dioxolane, 4-isopropyl dioxolane and 4-phenyl-1,3-dioxolane.

The resin composition of the present invention comprises at least one polymer (B) selected from the group consisting of polymers (B-1) and (B-2) detailed below and/or the lubricant (C) explained below in the branched polyacetal copolymer (A) described above. By using the branched polyacetal copolymer (A) as the base resin in which the polymer (B) and/or the lubricant (C) is compounded, the resulting molded article is endowed with an excellent sliding property while the appearance, dimensional accuracy, rigidity etc. thereof can be improved.

The polymer (B-1) used in the present invention is a graft or block copolymer obtained from an olefin polymer (b-1) and at least one vinyl polymer (b-2) wherein the olefin polymer (b-1) and the vinyl polymer (b-2) are chemically bound in a branched or cross-linked structure. Examples of the olefin polymer (b-1) constituting a main chain of the polymer (B-1) include homopolymers of poly α-olefins such as low-density polyethylene, ultra-low-density polyethylene, linear low-density polyethylene, medium-density polyethylene, high-density polyethylene, polypropylene and polybutene, hydrogenated products of polybutadiene, and copolymers comprising these monomers as the main component. Examples of the copolymers include ethylene-propylene copolymers and ethylene-1-butene copolymers, and other examples are ethylene-acrylate copolymers, and ethylene-α,β-unsaturated glycidyl ester copolymers. Among them, various types of polyethylene and polypropylene, and ethylene-propylene copolymers can be particularly preferably used. Examples of the vinyl copolymer (b-2) to be graft- or block-copolymerized with the olefin polymer (b-1) includes polymethyl methacrylate, polymethyl acrylate, polyethyl acrylate, polybutyl acrylate, poly(2-ethyl hexyl acrylate), polystyrene, polyacrylonitrile, acrylonitrile-styrene copolymers, butyl acrylate-methyl methacrylate copolymers, and butyl acrylate-styrene copolymers. Particularly preferable examples thereof are polymethyl methacrylate, acrylonitrile-styrene copolymers and polystyrene. The polymer (B-1) used in the present invention is characterized by that it is a graft or block copolymer having a linear, branched or cross-linked structure, wherein the olefin polymer (b-1) and vinyl polymer (b-2), which are different from each other in properties, are chemically bound at least one site. By the presence of such a structure, the remarkable effect, never achieved by sole incorporation of (b-1) or (b-2), can be achieved. The method of preparing the graft or block copolymer consisting of an olefin polymer (b-1) segment and a vinyl polymer (b-2) segment is not particularly limited, and generally it can be easily prepared by the well-known radical reaction. For example, the copolymer can be prepared by a method of adding a radical catalyst to polymer (b-1) and then melt/kneading the mixture, or by a method of making a free radical of polymer (b-1) or (b-2) by peroxides and then mixing it with another polymer. Also, the graft or block copolymer can be prepared by hydrogenation of styrene-butadiene rubber, etc. For constituing the graft or block copolymer (B-1), the weight ratio of the polymers (b-1) to (b-2) is suitably in a range of from 95:5 to 40:60. If the amount of the component (b-1) is more than that of the component (b-2) out of the ratio of 95:5, the separation of the polyolefin component from the branched polyacetal copolymer (A) remarkably occurs to cause the removal of the resulting resin and to deteriorate the abrasion property. On the contrary, if the amount of the component (b-1) is less than that of the component (b-2) out of the ratio of 40:60, the improving effect of the polyolefin component on the surface of the branched polyacetal copolymer (A) is insufficient, thus failing to achieve the improving effect on sliding properties, particularly on coefficient of friction. The graft or block copolymer as component (B-1) described above is also commercially available, e.g. as Modiper A1400, A1200, A1100™ (manufactured by Nippon Oil and Fats Co., Ltd.) etc.

The polymer (B-2) used in the present invention is a modified olefin polymer obtained by modifying an olefin polymer (b-3) with at least one compound selected from the group consisting of an unsaturated carboxylic acid, an unsaturated carboxylic acid anhydride and derivatives thereof. Examples of the olefin polymer (b-3) used herein include homopolymers of α-olefins such as ethylene, propylene, butene, hexene, octene, nonene, decene and dodecene, random, block or graft copolymers consisting of at least two members of the above-mentioned monomers, and random, block or graft copolymers consisting of at least one comonomer selected from non-conjugated diene components such as 1,4-hexadiene, dicyclopentadiene, 5-ethylidene-2-norbornane and 2,5-norbonadiene, conjugated diene components such as butadiene, isoprene and piperylene, α,β-unsaturated acids such as acrylic acid and methacrylic acid and their derivatives such as esters, aromatic vinyl compounds such as acrylonitrile, styrene and α-methyl styrene, vinyl esters such as vinyl acetate, vinyl ethers such as vinyl methyl ether, and derivatives of these vinyl compounds. The degree of polymerization, the presence or absence of side or branched chains, and the composition of copolymerization thereof are not limited.

Specific examples of the olefin polymer (b-3) include high-pressure-processed polyethylene, medium- and low-pressure-processed polyethylene, gas phase-processed ethylene-α-olefin copolymers, LLDPE, polypropylene, polybutene, ethylene-vinyl acetate copolymers, ethylene-methyl acrylate copolymers, ethylene-ethyl acrylate copolymers, ethylene-butyl acrylate copolymers, ethylene-propylene copolymers, ethylene-propylene-diene terpolymers. Preferred are polyethylene and ethylene-methyl acrylate copolymers and ethylene-ethyl acrylate copolymers.

The modified olefin copolymer (B-2) used in the present invention is obtained by modifying the olefin polymer (b-3) with at least one member selected from the group consisting of unsaturated carboxylic acids such as acrylic acid, methacrylic acid, maleic acid, citraconic acid, itaconic acid, tetrahydrophthalic acid, nadic acid, methyl nadic acid and allyl succinic acid, unsaturated carboxylic acid anhydrides such as maleic anhydride, citraconic anhydride, itaconic anhydride, tetrahydrophthalic anhydride, nadic anhydride, methyl nadic anhydride and allyl succinic anhydride, and derivatives thereof.

The MI of the modified olefin copolymer (B-2) is preferably from 0.01 to 100 g/10 min., more preferably from 0.1 to 50 g/10 min., particularly preferably from 0.2 to 30 g/10 min.

Preferred examples of the modified olefin copolymer (B-2) are polyethylene, polypropylene, ethylene-propylene copolymers and ethylene-ethyl acrylate copolymers, which are modified with maleic anhydride.

A preferable method of the modification is to react under heating the olefin copolymer (b-3) and at least one compound selected from unsaturated carboxylic acids, acid anhydrides thereof and derivatives thereof in the form of a solution or melt along with a radical initiator such as organic peroxide, but any other methods can also be used. As the amounts of both components, it is suitable that the compounds such as unsaturated carboxylic acids are used in an amount of 0.1 to 20 parts by weight, preferably 0.1 to 10 parts by weight, to 100 parts by weight of the olefin polymer (b-3). If the amount of the compounds such as unsaturated carboxylic acid is too small, the affinity between the branched polyacetal copolymer (A) and the modified olefin copolymer is not sufficiently improved, so the effect of the present invention cannot be achieved, while if it is excessive, physical properties to be improved, such as sliding property, may be deteriorated.

In the present invention, the amount of at least one polymer (B) selected from the group consisting of the polymers (B-1) and (B-2) described above is 0.5 to 40 parts by weight, preferably 1 to 30 parts by weight, to 100 parts by weight of the branched polyacetal copolymer (A). If the amount of the polymers (B) is too small, the effect of improving sliding property and moldability as the object of the present invention cannot be achieved, while if the amount is excessive, the mechanical property is significantly deteriorated, and the appearance of the resulting molded article is deteriorated due to the peeling on the surface.

The lubricant (C) is now described. The lubricant as component (C) refers to mineral oils such as spindle oil, refrigerator oil, turbine oil, machine oil, cylinder oil and gear oil; hydrocarbons such as liquid paraffin, paraffin wax, polyethylene wax and α-olefin oligomers; fatty acids such as lauric acid, myristic acid, palmitic acid, stearic acid, isostearic acid, arachidinoic acid, behenic acid and montanic acid; aliphatic alcohols such as hexyl alcohol, octyl alcohol, nonyl alcohol, isotridecyl alcohol, cetyl alcohol, stearyl alcohol, isostearyl alcohol and behenyl alcohol; fatty esters consisting of the fatty acids and aliphatic alcohols described above, for example lauryl laurate, isotridecyl stearate, stearyl stearate, behenyl behenate etc.; partial and/or full esters consisting of the fatty acids described above and polyvalent alcohols such as glycols, glycerin, polyglycerol, trimethylol propane, pentaerythritol and sorbitol, for example ethylene glycol distearate, trimethylol propane triisostearate, pentaerythritol tristearate, glycerin monostearate, glycerin distearate, glycerin tristearate, glycerin monobehenate, etc.; esters of the aliphatic alcohols described above and carboxylic acids such as succinic acid, malonic acid, adipic acid, maleic acid, fumaric acid and trimellitic acid, and inorganic acids such as boric acid and phosphoric acid, for example, di (2-ethyl hexyl) adipate, di(2-ethyl hexyl) phthalate, tristearyl phosphate, etc.; amides of the fatty acids described above and amine compounds such as ammonia, ethylene diamine and hexamethylene diamine, for example, fatty amide such as stearyl amide, palmityl amide, oleyl amide, methylene bis-stearoamide and ethylene bis-stearoamide; metal soap such as calcium stearate, zinc stearate and magnesium stearate; natural wax such as montan wax; silicone such as polydimethyl siloxane and polymethyl phenyl siloxane, and derivatives thereof; and substituted diphenyl ethers etc., and at least one member of these compounds can be used. Among these lubricants, preferred is at least one member selected from the group consisting of silicone, α-olefin oligomers, paraffin, substituted diphenyl ethers, $C_{10}$ or more fatty acid derivatives, and $C_{10}$ or more aliphatic alcohol derivatives in overall consideration of easy handling, processability, abrasion and friction resistance, mechanical properties, etc. The lubricant will be described in detail.

As silicone, polydimethyl siloxane and polymethyl phenyl siloxane having the structure (1) are preferably used.

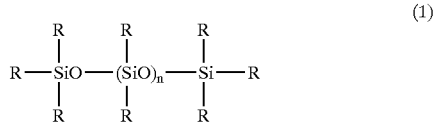

wherein R is a methyl group, and some Rs may be an alkyl group, a phenyl group, a halogenated alkyl group, a halogenated phenyl group, polyalkylene glycol etc.

It is also possible to use a modified polyorganosiloxane in which some methyl groups of dimethyl siloxanes is replaced by various substituents such as halogenated phenyl groups represented by chlorophenyl group, alkylene glycols represented by $C_8$ or more alkyl group and polyethylene glycol, higher fatty esters, which are derivatives of $C_8$ or more fatty carboxylic acids, and halogenated alkyl groups represented by trifluorbmethyl group. Such silicone preferably used in the present invention is one having a dynamic viscosity (at 25° C.) in a range of 100 to 100,000 cSt.

The α-olefin oligomers are aliphatic hydrocarbons having such a structure as α-olefins containing mainly 6 to 20 carbon atoms are polymerized solely or α-olefins containing 3 to 20 carbon atoms are copolymerized with ethylene. In the present invention, preferably used are the α-olefin oligomers and/or ethylene-α-olefin cooligomers having a number average molecular weight of 400 to 4000.

The paraffin refers to so-called paraffin mineral oils, which is obtained by refining petroleum fractions mainly. In the present invention, those having an average molecular weight in the range of 300 to 800 are preferably used.

The substituted diphenyl ethers are the compounds where at least one of $C_{12}$ or more saturated aliphatic chain selected from an alkyl group, an ester group and an ether group is introduced as a substituent into the phenyls thereof, as shown in the formula (2) below. Any alkyl-substituted diphenyl ethers can also be used without any particular limitation of their molecular weight.

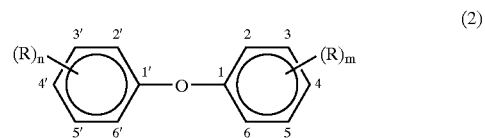

wherein R is an alkyl group, an ester group or an acyl group introduced into all or some of the 2- to 6-positions and 2'- to 6'-positions, and each of m and n is an integer of 0 to 5 provided that m and n are not simultaneously zero.

Examples of the substituents of the alkyl-substituted diphenyl ethers include straight-chain alkyl groups such as dodecyl group, tetradecyl group, hexadecyl group and octadecyl group and branched alkyl groups represented by the formula (3):

wherein each of m and n is an integer of 0 or more provided that the sum of m+n is 11 or more.

Examples of the ester group (QOCO— or QCOO—) include a dodecyloxy carbonyl group, tetradecyloxy carbonyl group, hexadecyloxy carbonyl group, octadecyloxy carbonyl group, lauroyloxy group, myristoyloxy group, palmitoloxy group and stearoyloxy group. Examples of the acyl group include a lauroyl group, myristoyl group, palmitoyl group and stearoyl group. Further, a group derived from, for example, isostearyl alcohol, isostearic acid, etc. in which an aliphatic hydrocarbon chain of the ester or acyl group has a branched structure, may be used. The effect of such substituted diphenyl ethers is not limited by the positions of substituent groups. Although any substituted diphenyl ethers can be preferably used, preferable for synthesis are substituted diphenyl ethers having substituent groups at all or some of the 2-, 4-, 6-, 2'-, 4'-, and 6'-positions and particularly preferably 4,4'-disubstituted ones.

The derivatives of $C_{10}$ or more fatty acids in the present invention are esters of $C_{10}$ or more fatty acids and $C_{10}$ or more monovalent or multivalent aliphatic and/or aromatic aliphatic alcohols, and amides of $C_{10}$ or more fatty acids and primary, secondary or tertiary amines. Examples of the $C_{10}$ or more fatty acids, which constitute such esters, include saturated fatty acids, unsaturated fatty acids, straight-chain and branched fatty acids, such as lauric acid, tridecanoic acid, myristic acid, palmitic acid, stearic acid, isostearic acid, oleic acid, linoleic acid, lenolenic acid, arachidinoic acid, behenic acid, linoglyceric acid, cerotic acid, montanic acid and melissic acid, and derivatives of these fatty acids, for example, 2-bromostearic acid, 18-bromostearic acid, 18-hydroxystearic acid etc., and any of these compounds can be preferably used. Examples of the alcohols, which constitute esters along with such fatty acids, include monovalent saturated and unsaturated aliphatic alcohols and straight-chain and branched alcohols such as n-octyl alcohol, 2-ethyl hexyl alcohol, isononyl alcohol, n-decyl alcohol, isodecyl alcohol, lauryl alcohol, myristyl alcohol, cetyl alcohol, 14-methylhexadecane-1-ol, stearyl alcohol, oleyl alcohol, 16-methyl hexadecanol, 18-methyl nonadecanol, 18-methyl ecosanol, docosanol, 20-methyl heneicosanol, 20-methyl docasanol, tetracosanol, tetracosanol, hexacosanol and octacosanol, and any of them can be preferably used. Examples of the aromatic alcohols, which constitute such esters, include phenol, catechol, andnaphthol. Examples of the aliphatic polyvalent alcohols include polyvalent alcohols such as ethylene glycol, propylene glycol, 1,4-butane diol, 1,5-pentane diol, 1,6-hexane diol, 1,2-octane diol, hexadecane-1,2-diol, octadecane-1,2-diol, icosan-1,2-diol, glycerin, trimethylol propane, erythritol, pentaerythritol, sorbitol, 1,2-cyclononane diol and 1,2-cyclodecane diol, condensates of these polyvalent alcohols such as dipentaerythritol, tripentaerythritol, diethyleneglycol, diglycerol, triglycerol, polyglycerol, polyethylene glycol and polypropylene glycol, and partial esters of polybasic acids such as succinic acid and adipic acid and the polyvalent alcohols described above, and any of them can be preferably used.

Examples of the amides include the above-described $C_{10}$ or more fatty acids and primary, secondary or tertiary amines such as ammonia, ethylene diamine, tetramethylene diamine and monoethanol amine, and any of them can be preferably used. Specific examples thereof include palmitinate amide, stearate amide, ethylene bis-stearate amide and tetramethylene bis-stearate amide.

As the derivatives of $C_{10}$ or more aliphatic alcohols in the present invention, esters of $C_{10}$ or more aliphatic alcohols and $C_{10}$ or more monovalent or polyvalent aliphatic and/or aromatic carboxylic acids are cited. Examples of the $C_{10}$ or more aliphatic alcohols, which constitute such esters, include saturated and unsaturated aliphatic alcohols and straight-chain and branched alcohols, such as lauryl alcohol, myristyl alcohol, cetyl alcohol, 14-methylhexadecane-1-ol, stearyl alcohol, oleyl alcohol, 16-methyl hexadecanol, 18-methyl nonadecanol, 18-methyl icosanol, docosanol, 20-methyl henicosanol, 20-methyl docosanol, tetracosanol, tetracosanol, hexacosanol and octacosanol, and any of them can be preferably used. Examples of the fatty acids, which constitute esters along with such alcohols, include saturated fatty acids, unsaturated fatty acids, straight-chain fatty acids and branched fatty acids, such as lauric acid, tridecanoic acid, myristic acid, palmitic acid, stearic acid, isostearic acid, oleic acid, linoleic acid, lenolenic acid, arachidinoic acid, behenic acid, linoglyceric acid, cerotic acid, montanic acid, melissic acid and derivatives of the above-described fatty acids, for example 2-bromostearic acid, 18-bromostearic acid, 12-hydroxy stearic acid etc., and any of them can be preferably used. Examples of the aromatic carboxylic acids include benzoic acid and phthalic acid. Examples of the aliphatic polybasic acids include aliphatic polybasic acids such as oxalic acid, malonic acid, succinic acid, glutaric acid, adipic acid, pimelic acid, suberic acid, azelaic acid, sebacic acid, 1,12-dodecamethylene dicarboxylic acid, 1,14-tetradecamethylene dicarboxylic acid, 1,16-hexadecamethylene dicarboxylic acid, 1,18-octadecamethylene dicarboxylic acid, trimellitic acid, maleic acid, fumaric acid and derivatives of these carboxylic acids, and any of them can be preferably used.

Although any esters of carboxylic acids and alcohols described above can be preferably used, the following esters are more preferably used for their availability. That is, at least one ester selected from lauryl laurate, lauryl stearate, cetyl palmitate, isotridecyl stearate, oleyl oleate, stearyl stearate, isostearyl stearate, isostearyl isostearate, behenyl behenate, ethylene glycol distearate, glycerin monostearate, glycerin monobehenate, glycerin di- or tri-stearate, trimethylol propane triisostearate, pentaerythritol tetraisostearate, pentaerythritol tetrastearate, polyethylene glycol dilaurate, polyethylene glycol distearate, diisotridecyl adipate and diisotridecyl phthalate.

The amount of the lubricant (C) to be added in the present invention is 0.1 to 5 parts by weight, to 100 parts by weight of the branched polyacetal copolymer (A). If the amount is less than 0.1 part by weight, the original effect of the lubricant is hardly exhibited, while the amount is more than 5 parts by weight, the properties of the branched polyacetal copolymer (A) as the base may be damaged to deteriorate rigidity and appearance of the resulting molded article. More preferably, the amount is 0.5 to 5 parts by weight.

In the present invention, the desired effect is achieved by blending the branched polyacetal copolymer (A) as the base with either the polymer (B) or the lubricant (C) described above, but the synergistic effect is remarkably exhibited by using both the polymer (B) and the lubricant (C), thus significantly improving not only sliding properties but also general physical properties. The lubricant (C) such as mineral oil, fatty ester, etc. is generally used for the purpose of improving sliding property. But when such lubricants are solely incorporated into the conventional polyacetal resins having no branched structure, it is difficult to uniformly disperse them even if they are added in an amount enough to achieve the necessary sliding property, and upon kneading the lubricant (C), slide of the resin on a screw in an extruder is caused to generate a surging phenomena, and problems such as venting up of non-molten resin on a vent hole, thus making the preparation of a uniform composition difficult, and upon molding, there arise problems such as insufficient bite and plasticization, and when used, there arise problems such as oozing (bleeding) of a large amount of the lubricant on the surface of a molded article.

On the contrary, the branched polyacetal copolymer (A) as the base resin in the present invention has a branched structure in itself, thereby exhibiting not only excellent mechanical properties but also suitable compatibility with the component (B) and particularly with the lubricant as the component (C), which would bring about the effect of the present invention. Further, when the components (B) and (C) are used in combination in the present invention, the component (B) acts as a carrier for the lubricant (C) to further improve compatibility, which would make the effect more significant. This effect is particularly significant when fatty acids, alcohols, fatty esters etc. are coexistent as the lubricant (C).

The resin composition of the present invention may preferably be blended with various stabilizers selected as necessary. Examples of the stabilizers include at least one selected from hindered phenolic compounds, nitrogen-containing compounds, alkali or alkaline earth metal hydroxides, inorganic salts and carboxylates. Further, one or more common additives for thermoplastic resin, such as coloring agents e.g. dye, pigment etc., lubricants, releasing agents, antistatic agents, surfactants, organic polymer materials, and inorganic or organic fillers in a form of fiber, powder and plate may be added as necessary as far as the object and effect of the present invention are not hindered.

The composition of the present invention can be easily prepared by any known methods generally used for preparing conventional resin compositions. For example, a method of mixing the respective components, kneading and extruding the mixture in a single- or twin-screw extruder to prepare pellets or a method of preparing pellets having a different composition (master batch) and mixing (diluting) a predetermined amount of the pellets. Any of them may be used. Further, in preparation of the composition, a method of grinding all or some of the components, mixing them with other components and extruding the mixture is preferable for improving the dispersibility of the composition. When the lubricant (C) is used in a form of liquid, a method of previously mixing the lubricant with the other components to impregnate and then kneading and extruding the mixture, is also preferable in that easiness of the preparation of the composition and improvements of processability and sliding properties.

EFFECT OF THE INVENTION

The branched polyacetal resin composition of the present invention attains improvements in thermostability and frictional and abrasion properties so that it can preferably be used in sliding parts such as gears, bearings, sliders and rollers.

EXAMPLES

Now, the present invention will be described in detail by reference to the Examples, which are not intended to limit the present invention. Evaluation was conducted in the following manner.

[Friction and Abrasion Test]

A specimen was allowed to slide under the following conditions against a steel material (S55C) or polyacetal resin (Juracon M90-44™, manufactured by Polyplastics Co., Ltd.) in a Suzuki-type friction and abrasion tester (EFM-111-EN, manufactured by Orientech) to determine specific abrasion wear (mm$^3$/kmkgf) and coefficient of dynamic friction after sliding for 8 hours.

Sliding Conditions

| | |
|---|---|
| Contact area: | 2.0 cm$^2$ |
| Surface pressure: | 0.98 MPa |
| Linear velocity: | 15 cm/sec. |

[Surface Condition of Molded article]

A specimen for evaluation (50 mm×50 mm×1 mm, center pin gate system) was molded and examined for removal of the surface in 5 ranks (5 is best and free of removal; 1 is worst and significant removal).

Examples 1 to 18

A continuous mixing reactor constituted from a jacket for passing a heating (or cooling) medium at outside, a barrel having a shape where circles of two cross sections are partially overlapped, and rotating shafts equipped with a paddle was used, and trioxane (a-1), the monofunctional glycidyl compound (a-2) and the cyclic ether compound (a-3) were added thereinto in a ratio shown in Table 1 while each of two rotating shafts having a paddle was rotated at 150 rpm. Then, methylal was continuously fed as the molecular-weight regulator, and as the catalyst, a solution of boron trifluoride-dibutyl ethelate in dibutyl ether was mixed therewith in an amount of 0.005% by weight on a basis of boron trifluoride to the trioxane, and the uniform mixture was bulk-polymerized. The reaction product discharged from the polymerizer was immediately passed through a grinder and added to an aqueous solution containing 0.05% by weight of triethylamine at 60° C. to deactivate the catalyst. After separation, washing and drying, a crude polyacetal copolymer was obtained.

Then, to 100 parts by weight of the crude polyacetal copolymer were added 4% by weight of a 5% by weight aqueous solution of triethylamine and 0.3% by weight of pentaerythrityl-tetrakis [3-(3,5-di-tert-butyl-4-hydroxyphenyl) propionate], followed by subjecting to melting and kneading at 210° C. in a twin extruder to remove unstable parts. The structure and copolymerizing composition of the resulting polyacetal copolymer were confirmed by means of a $^1$H-NMR measurement using hexafluoroisopropanol-d$_2$ as a solvent.

To 100 parts by weight of the branched polyacetal copolymer obtained above, additives (B) and (C) shown in Table 1 were added, and as the stabilizer 0.03 part by weight of pentaerythrityl-tetrakis [3-(3,5-di-tert-butyl-4-hydroxyphenyl) propionate] and 0.15 part by weight of melamine were added, followed by subjecting and kneading at 210° C. using a twin extruder whereupon a branched polyacetal resin composition in a form of pellets was obtained. Results of the evaluation as evaluated by the above-mentioned methods are shown in Table 1.

Comparative Examples 1 to 13

Compositions in a form of pellets were prepared in the same manner as in the Examples except that a polyacetal copolymer having no branched structure, prepared without using the monofunctional glycidyl compound (a-2), was used as the base resin, or the branched polyacetal copolymer was not blended with (B) and (C). or the amounts of the components (B) and (C) were too small or excessive. Results are shown in Table 2.

TABLE 1

| | Polyacetal copolymer (A); polymer composition | | | | | | | Resin composition | | | |
|---|---|---|---|---|---|---|---|---|---|---|---|
| | Trioxane | Component (a-2) | | Component (a-3) | | Other components | | Parts | Component (B) | | Component (C) | |
| Ex | (a-1) parts by weight | Type | parts by weight | Type | parts by weight | Type | parts by weight | by weight (A) | Type | parts by weight | Type | parts by weight |
| 1 | 100 | a-2-1 | 0.3 | a-3-1 | 3.3 | — | — | 100 | B-1-1 | 5 | — | — |
| 2 | 100 | a-2-1 | 0.0005 | a-3-1 | 3.3 | — | — | 100 | B-1-1 | 5 | — | — |
| 3 | 100 | a-2-2 | 0.3 | a-3-1 | 3.3 | — | — | 100 | B-1-1 | 5 | — | — |
| 4 | 100 | a-2-3 | 0.3 | a-3-1 | 3.3 | — | — | 100 | B-1-1 | 5 | — | — |
| 5 | 100 | a-2-1 | 0.3 | a-3-2 | 3.3 | d-1 | 0.01 | 100 | B-1-1 | 5 | — | — |
| 6 | 100 | a-2-1 | 0.3 | a-3-1 | 3.3 | — | — | 100 | B-2-1 | 5 | — | — |
| 7 | 100 | a-2-1 | 0.3 | a-3-1 | 3.3 | — | — | 100 | B-2-2 | 5 | — | — |
| 8 | 100 | a-2-1 | 0.3 | a-3-1 | 3.3 | — | — | 100 | B-1-1 | 5 | — | — |
| 9 | 100 | a-2-1 | 0.3 | a-3-1 | 3.3 | — | — | 100 | B-1-1 | — | — | — |
| 10 | 100 | a-2-1 | 0.3 | a-3-1 | 3.3 | — | — | 100 | B-1-1 | 30 | — | — |

TABLE 1-continued

| | | | | | | | | | | | |
|---|---|---|---|---|---|---|---|---|---|---|---|
| 11 | 100 | a-2-1 | 0.3 | a-3-1 | 3.3 | — | — | 100 | — | — | C-1 | 2 |
| 12 | 100 | a-2-1 | 0.3 | a-3-1 | 3.3 | — | — | 100 | — | — | C-2 | 2 |
| 13 | 100 | a-2-1 | 0.3 | a-3-1 | 3.3 | — | — | 100 | — | — | C-3 | 2 |
| 14 | 100 | a-2-1 | 0.3 | a-3-1 | 3.3 | — | — | 100 | — | — | C-4 | 2 |
| 15 | 100 | a-2-1 | 0.3 | a-3-1 | 3.3 | — | — | 100 | — | — | C-2 | 0.2 |
| 16 | 100 | a-2-1 | 0.3 | a-3-1 | 3.3 | — | — | 100 | — | — | C-2 | 4 |
| 17 | 100 | a-2-1 | 0.3 | a-3-1 | 3.3 | — | — | 100 | B-1-1 | 5 | C-4 | 2 |
| 18 | 100 | a-2-1 | 0.3 | a-3-1 | 3.3 | — | — | 100 | B-2-1 | 5 | C-3 | 2 |

| | | Friction and abrasion test | | | |
|---|---|---|---|---|---|
| | Surface condition of molded | Against steel | | Against polyacetal | |
| Ex | article | $\mu$ | Specific abrasion wear | $\mu$ | Specific abrasion wear |
| 1 | 4 | 0.24 | 0.78 | 0.27 | 15 |
| 2 | 3 | 0.25 | 0.86 | 0.29 | 22 |
| 3 | 4 | 0.23 | 0.81 | 0.28 | 13 |
| 4 | 4 | 0.25 | 0.77 | 0.25 | 18 |
| 5 | 4 | 0.24 | 0.75 | 0.28 | 17 |
| 6 | 4 | 0.25 | 0.79 | 0.27 | 15 |
| 7 | 4 | 0.29 | 0.88 | 0.26 | 16 |
| 8 | 4 | 0.26 | 0.86 | 0.27 | 19 |
| 9 | 5 | 0.30 | 0.86 | 0.28 | 25 |
| 10 | 3 | 0.21 | 0.43 | 0.24 | 13 |
| 11 | 5 | 0.16 | 0.65 | 0.31 | 19 |
| 12 | 5 | 0.19 | 0.68 | 0.30 | 19 |
| 13 | 5 | 0.20 | 0.66 | 0.28 | 21 |
| 14 | 5 | 0.19 | 0.68 | 0.27 | 20 |
| 15 | 5 | 0.29 | 0.87 | 0.27 | 23 |
| 16 | 4 | 0.16 | 0.60 | 0.26 | 17 |
| 17 | 4 | 0.23 | 0.71 | 0.25 | 15 |
| 18 | 4 | 0.22 | 0.72 | 0.22 | 12 |

TABLE 2

| | Polyacetal copolymer (A); polymer composition | | | | | | | Resin composition | | | | |
|---|---|---|---|---|---|---|---|---|---|---|---|---|
| | Trioxane | Component (a-2) | | Component (a-3) | | Other components | | Parts by weight (A) | Component (B) | | Component (C) | |
| Com. Ex. | (a-1) parts by weight | Type | parts by weight | Type | parts by weight | Type | parts by weight | | Type | parts by weight | Type | parts by weight |
| 1 | 100 | — | — | a-3-1 | 3.3 | — | — | 100 | B-1-1 | 5 | — | — |
| 2 | 100 | — | — | a-3-a | 3.3 | — | — | 100 | B-2-1 | 5 | — | — |
| 3 | 100 | — | — | a-3-1 | 3.3 | — | — | 100 | B-2-2 | 5 | — | — |
| 4 | 100 | a-2-1 | 0.3 | a-3-1 | 3.3 | — | — | 100 | B-1-1 | 0.2 | — | — |
| 5 | 100 | a-2-1 | 0.3 | a-3-1 | 3.3 | — | — | 100 | B-1-1 | 50 | — | — |
| 6 | 100 | — | — | a-3-1 | 3.3 | — | — | 100 | — | — | C-1 | 2 |
| 7 | 100 | — | — | a-3-1 | 3.3 | — | — | 100 | — | — | C-2 | 2 |
| 8 | 100 | — | — | a-3-1 | 3.3 | — | — | 100 | — | — | C-3 | 2 |
| 9 | 100 | — | — | a-3-1 | 3.3 | — | — | 100 | — | — | C-4 | 2 |
| 10 | 100 | a-2-1 | 0.3 | a-3-1 | 3.3 | — | — | 100 | — | — | C-2 | 0.05 |
| 11 | 100 | a-2-1 | 0.3 | a-3-1 | 3.3 | — | — | 100 | — | — | C-2 | 10 |
| 12 | 100 | — | — | a-3-1 | 3.3 | — | — | 100 | B-1-1 | 5 | C-4 | 2 |
| 13 | 100 | — | — | a-3-1 | 3.3 | — | — | 100 | B-2-1 | 5 | C-3 | 2 |

| | | Friction and abrasion test | | | |
|---|---|---|---|---|---|
| | Surface condition of molded | Against steel | | Against polyacetal | |
| Ex | article | $\mu$ | Specific abrasion wear | $\mu$ | Specific abrasion wear |
| 1 | 2 | 0.23 | 1.23 | 0.32 | 28 |
| 2 | 2 | 0.30 | 1.36 | 0.33 | 28 |
| 3 | 2 | 0.25 | 1.22 | 0.30 | 31 |
| 4 | 5 | 0.29 | 0.97 | 0.27 | 30 |

TABLE 2-continued

| | | | | | |
|---|---|---|---|---|---|
| 5 | 1 | 0.21 | 1.44 | 0.22 | 33 |
| 6 | 2 | 0.16 | 0.69 | 0.32 | 22 |
| 7 | 2 | 0.18 | 0.73 | 0.30 | 20 |
| 8 | 2 | 0.20 | 0.69 | 0.30 | 22 |
| 9 | 2 | 0.18 | 0.67 | 0.29 | 23 |
| 10 | 4 | 0.27 | 0.88 | 0.27 | 27 |
| 11 | 1 | 0.19 | 0.79 | 0.23 | 29 |
| 12 | 2 | 0.22 | 0.79 | 0.27 | 15 |
| 13 | 2 | 0.25 | 0.77 | 0.21 | 16 |

Component (a-2)
 a-2-1: Butyl glycidyl ether
 a-2-2: 2-Ethyl hexyl glycidyl ether
 a-2-3: Glycidyl stearate
Component (a-3)
 a-3-1: 1,3-Dioxolane
 a-3-2: Ethylene oxide
Other Copolymerizing Components
 d-1: Butyl diglycidyl ether
Component (B-1)
 B-1-1: A graft copolymer between polyethylene (50% by weight) and an acrylonitrile-styrene copolymer (50% by weight)
Component (B-2)
 B-2-1: 1% maleic anhydride-modified polyethylene
 B-2-2: 1% maleic anhydride-modified ethylene-ethyl acrylate copolymer
Component (C)
 C-1: Polydimethyl siloxane (average molecular weight: 18000; dynamic viscosity: 1000 cSt)
 C-2: Paraffin oil (average molecular weight: 750)
 C-3: Stearyl stearate (average molecular weight 536; solid)
 C-4: Ethylene glycol monoisostearate

What is claimed is:

1. A branched polyacetal resin composition, comprising:
 100 parts by weight of a branched polyacetal copolymer (A) having an oxymethylene group as the main repeating unit and having a branching unit represented by the following formula (I), wherein the branched copolymer (A) is the copolymerization reaction product of 100 parts by weight of trioxane (a-1), 0.001 to 10 parts by weight of a monfunctional glycidyl compound (a-2) selected from the group consisting of a glycidyl ether compound represented by the following formulae (II), (III) and (IV), and a glycidyl ester compound, each having a molecular weight of 100 to 1000, and 0.1 to 20 parts by weight of a cyclic ether compound (a-3) which is copolymerizable with trioxane selected from the group consisting of ethylene oxide, 1,3-dioxolan, diethylene glycol formal and 1,4-butanediol formal, and
 0.5 to 40 parts by weight of at least one polymer (B) selected from the group consisting of the following polymers (B-1) and (B-2),
  polymer (B-1): a graft or block copolymer prepared from an olefin polymer (b-1) and at least one vinyl polymer (b-2); and
  polymer (B-2): a modified olefin polymer in which an olefin polymer (b-3) is modified with at least one compound selected from the group consisting of an unsaturated carboxylic acid, an unsaturated carboxylic acid anhydride and derivatives thereof, wherein formulae (I)–(IV) are as follows:

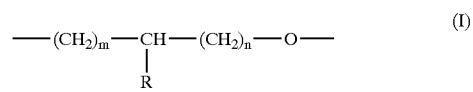

wherein m and n each is an integer of 0 to 5; the sum of m+n is 1 to 5; and R is a monovalent organic group having a molecular weight of 40 to 1000,

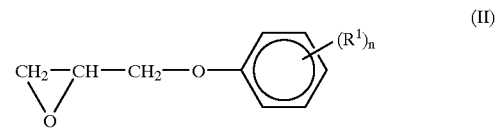

wherein $R^1$ is a $C_{1-12}$ alkyl group, a substituted alkyl group, an alkoxy group, an aryl group, a substituted aryl group or halogen; and n is an integer of 0 to 5 and, when n is 2 or more, the $R^1$s may be the same or different:

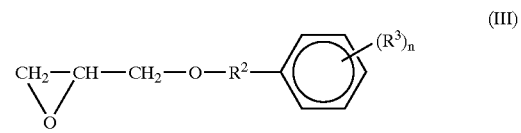

wherein $R^2$ is a $C_{1-30}$ alkylene group, a substituted alkylene group or a polyalkylene oxide glycol residue; $R^3$ is a $C_{1-12}$ alkyl group, a substituted alkyl group, an alkoxy group, an aryl group, a substituted aryl group or halogen; and n is an integer of 0 to 5 and, when n is 2 or more, the $R^3$s may be the same or different:

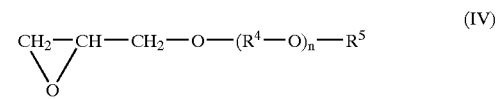

wherein $R^4$ is a $C_{1-30}$ alkylene group; n is an integer of 0 to 20; and $R^5$ is a $C_{1-30}$ alkyl group, a $C_{2-20}$ alkenyl group or an alkynyl group.

2. The composition according to claim 1, wherein the polymer (B-1) is prepared from at least one olefin polymer (b-1) selected from the group consisting of polyethylene, polypropylene and an ethylene-propylene copolymer, and at least one vinyl polymer (b-2) selected from the group consisting of methyl polymethylmethacrylate, an acrylonitrile-styrene copolymer and polystyrene.

3. The composition according to claim 1, wherein the polymer (B-2) is a modified olefin polymer where 100 parts by weight of the olefin polymer (b-3) is modified with 0.1 to 20 parts by weight of maleic anhydride.

4. The composition according to claim 1, wherein the polymer (B-2) is a modified olefin polymer where at least one olefin polymer (b-3) selected from the group consisting of polyethylene, polypropylene, an ethylene-propylene copolymer, an ethylene-ethyl acrylate copolymer and an ethylene-methyl acrylate copolymer, is modified.

5. The composition according to claim 1, further comprising 0.1 to 5 parts by weight of a lubricant (C).

6. The composition according to claim 5, wherein the lubricant (C) is at least one compound selected from the group consisting of silicone, an α-olefin oligomer, paraffin, a substituted diphenyl ether, derivatives of fatty acid having 10 or more carbons and derivatives of aliphatic alcohol having 10 or more carbons.

* * * * *